May 13, 1958  E. F. EGER ET AL  2,834,317
WOUND CAPACITOR RACKS
Filed July 1, 1954
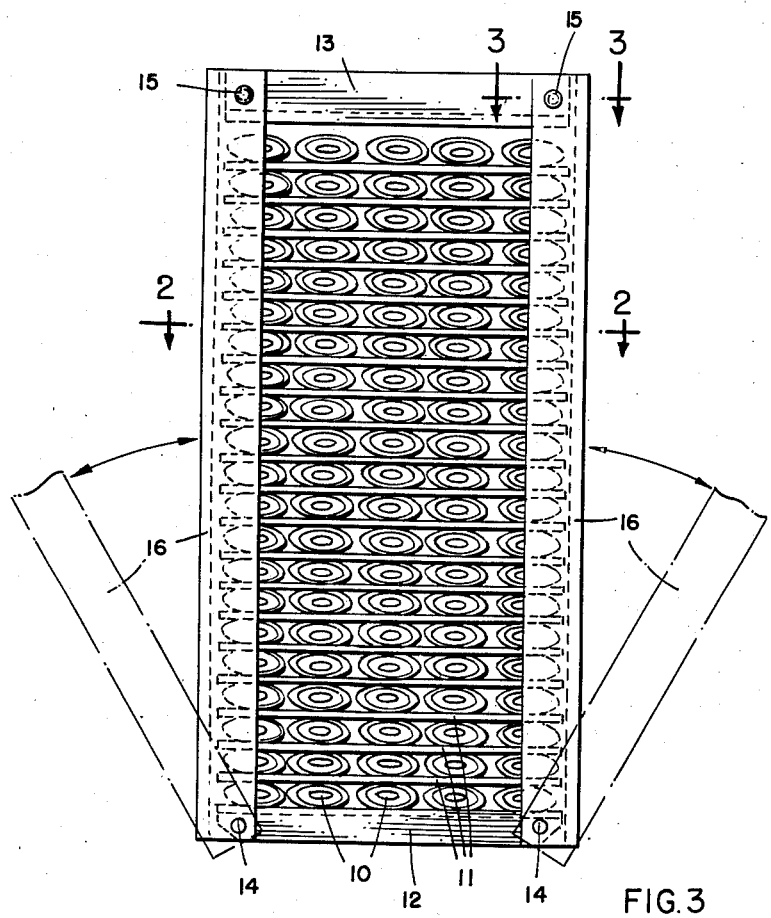
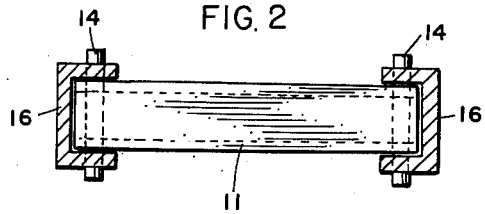
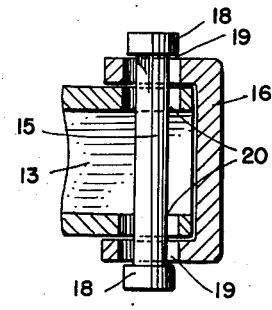
INVENTORS:
E. F. EGER
W. O. SIMPSON
BY *C. B. Hamilton*
ATTORNEY

United States Patent Office 2,834,317
Patented May 13, 1958

2,834,317

WOUND CAPACITOR RACKS

Edward F. Eger and Warren O. Simpson, Indianapolis, Ind., assignors to Western Electric Company, Incorporated, New York, N. Y., a corporation of New York Application July 1, 1954, Serial No. 440,766

4 Claims. (Cl. 118—503)

This invention relates to wound capacitor racks, and more particularly to quickly disassemblable racks for holding wound capacitors while they are impregnated and sprayed with solder.

An object of the invention is to provide new and improved wound capacitor racks.

Another object of the invention is to provide wound capacitor racks which may be quickly disassembled for holding wound capacitors in compressed condition while being impregnated, and while metal terminals are sprayed thereon.

A further object of the invention is to provide a rack which may be easily held while wound metallized capacitors are stacked therein and compressed, and which may be quickly disassembled to permit removal of the capacitors therefrom.

A rack illustrating certain features of the invention may include a pair of side channel members mounted pivotally on a bottom bar for holding a plurality of spacer plates positioned between capacitors in a compressed condition. A top bar and quickly releasable means for securing the top bar to the side channel members to permit the spacer plates and the capacitors to be removed from the rack.

A complete understanding of the invention may be obtained from the following detailed description of a rack forming a specific embodiment thereof, when read in conjunction with the appended drawings, in which Fig. 1 is a front elevation of a rack forming one embodiment of the invention;

Fig. 2 is a horizontal section taken along line 2—2 of Fig. 1, and

Fig. 3 is a fragmentary horizontal section taken along line 3—3 of Fig. 1.

Referring now in detail to the drawings, there is shown therein a pair of U-shaped side channel members 16 which are pivotally secured to a bottom channel bar 12 by pins 14. A top bar 13 is detachably secured to the side channel member 16 by pins 15 having heads 18 which will travel through bores 19 and 20 in the channels 16 and the bar 13. In the use of the rack, the bar 13 is removed from the channels 16 which are held in the positions shown in full lines in Fig. 1 by a suitable U-shaped holding fixture, after which wound capacitor units 10 are piled in rows on the bottom bar 12 with spacer plates 11 positioned between each horizontal row, and the spacer plates 11 extend into the channels 16 and are movable up and down laterally in these channels. The capacitors 10 and the plates 11 are piled to a height above the channels 16, and then are compressed, pressing against the top thereof to move all the capacitors and plates into the channels 16. Then the bar 13 is placed in the channels 16 while the capacitors 10 are under compression and pins 15 are inserted to lock these bars to the channels, after which the stack of capacitors and plates are released and push the bar 13 upwardly as far as it is permitted to go by the pins 15, which prevents the pins 15 being accidentally dislodged from the bores 19 and 20.

The rack full of capacitors then may be placed in an impregnating chamber and/or the ends of the capacitors may be sprayed with solder or the like to provide suitable terminals thereon. After this, the bar 13 is pressed toward the bottom bar 12 sufficiently to free the pins 15, which are removed from the rack. The top bar then is removed from the stack of capacitors, and the channels 16 are swung to their broken line positions shown in Fig. 1 to release the stack of capacitors.

The above-described rack may be very easily held in the holding fixture for loading, and the bar 13 may be quickly detached and removed from the channels 16, which are light in weight but securely retain the spacer plates in stacked positions whereby the capacitors are held securely in the rack. The capacitors and the spacer plates may be removed from the rack after the bar 13 is disconnected from the rack by swinging the channels 16 in their broken line positions and removing the rack from the capacitors and spacer plates.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A capacitor rack which comprises a pair of U-shaped channel members having the open portions thereof facing each other, a bottom bar pivotally secured at each end to a lower end of one of said U-shaped members, a plurality of spacer bars of such length as to extend into both said channel members, a top bar, said top bar and the upper ends of said channel members being provided with a pair of aligned apertures, a pair of pins extending through said apertures, and a head on the end of each pin of a diameter that is slightly less than the diameter of said apertures.

2. A capacitor rack, which comprises a bottom bar of a length greater than the combined width of several compressed wound capacitors, a pair of side channels pivotally secured to the bottom bar and movable between parallel loading positions in which the channels face inwardly of one another and opened unloading positions, a plurality of spacer plates each extending from the interior of one channel to the interior of the other channel and slidable in the channels laterally of the spacer plates for separating rows of said wound capacitors, a top bar of substantially the same length as the bottom bar and securable to the side channels for retaining the spacer plates and capacitors in the channels, said side channels having pairs of aligned bores of a predetermined diameter in the upper ends thereof, said top bar having pairs of aligned bores alignable with and of the same diameter as the bores in the channels, and a pair of pins having shank portions smaller than the bores and head portions larger than the shank portions for locking the top bar to the channels.

3. A capacitor rack, which comprises a bottom bar of a length greater than the combined width of several compressed wound capacitors, a pair of channels hinged to the bottom bar between loading positions in which the channels are parallel and face inwardly of one another to form a guideway and open unloading positions, a plurality of spacer plates slidable in the guideway for separating the wound capacitors in rows a compressed condition, a top bar of substantially the same length as the bottom bar, and quick-detachable means for securing the top bar to the channels.

4. A capacitor rack, which comprises a pair of side channel members, a bottom bar pivotally secured to one end of each of the side channels, said bottom bar being of a length greater than the combined width of several compressed wound capacitors, a top bar of substantially the same length as the bottom bar, a plurality of spacer plates, and quick-detachable means securing the top bar to the side channels for holding the channels in parallel inwardly facing positions and to retain a plurality of compressed capacitors separated by the spacer plates.

References Cited in the file of this patent

UNITED STATES PATENTS

| | | |
|---|---|---|
| 1,666,044 | Danziger | Apr. 10, 1928 |
| 2,528,807 | Whitney | Nov. 7, 1950 |
| 2,542,719 | Sprague | Feb. 20, 1951 |
| 2,665,659 | Ogle | Jan. 12, 1954 |